United States Patent
Kurapati et al.

(10) Patent No.: US 6,990,635 B2
(45) Date of Patent: Jan. 24, 2006

(54) USER INTERFACE FOR COLLECTING VIEWER RATINGS OF MEDIA CONTENT AND FACILITATING ADAPTION OF CONTENT RECOMMENDERS

(75) Inventors: Kaushal Kurapati, Yorktown Heights, NY (US); James David Schaffer, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 863 days.

(21) Appl. No.: 09/768,913

(22) Filed: Jan. 24, 2001

(65) Prior Publication Data
US 2002/0097265 A1    Jul. 25, 2002

(51) Int. Cl.
*G06F 5/00*    (2006.01)
(52) U.S. Cl. .......................................... 715/747; 725/37
(58) Field of Classification Search ................ 345/716, 345/723, 733; 725/37, 38, 39, 40, 46; 715/745, 715/747, 716, 733
See application file for complete search history.

(56) References Cited

U.S. PATENT DOCUMENTS

| | | | | |
|---|---|---|---|---|
| 6,020,883 A | * | 2/2000 | Herz et al. ..................... | 348/10 |
| 6,481,011 B1 | * | 11/2002 | Lemmons ..................... | 725/47 |

* cited by examiner

*Primary Examiner*—Cao (Kevin) Nguyen
(74) *Attorney, Agent, or Firm*—Larry Liberchuk

(57) ABSTRACT

A user interface for a TV recommender system includes a display screen having a first region for displaying a rating derived from a previously defined TV viewing preference profile contained in the recommender system; and a second region displaying preference settings in the profile which were used to derive the rating. The user interface enables the preference settings to be changed if the rating derived by the profile is incorrect. Additionally, the user interface allows for new features to be added to the profile, which were not previously a part of the profile.

32 Claims, 2 Drawing Sheets

USER INTERFACE FOR COLLECTING VIEWER RATINGS OF MEDIA CONTENT AND FACILITATING ADAPTION OF CONTENT RECOMMENDERS

FIELD OF THE INVENTION

This invention relates to television (TV) recommenders, and more particularly to a user interface for collecting viewer ratings of TV shows and enabling user to correct any errors in preference profiles derived previously.

BACKGROUND OF THE INVENTION

Personal television (PTV) services enable viewers to view programs at anytime, independent of when the broadcasters choose to show them. This is typically accomplished by providing viewers with Personal TV Recorders which are essentially set top boxes equipped with hard-drives. The PTV service is loaded on the hard-drives, thus, enabling the set top boxes to selectively record and playback live television broadcasts. Many of these PTV services include program recommenders which recommend television shows based on the viewer's personal TV viewing profile.

The TV viewing profiles are currently derived using three basic methods: implicit profiling; explicit profiling; and feedback profiling. Implicit profiling methods derive TV viewing profiles unobtrusively from the viewer's television viewing histories, i.e., sets of TV shows watched and not watched. Explicit profiling methods derive TV viewing profiles from viewer answered questionnaires that include explicit questions about what the viewer likes and dislikes. Feedback profiling methods derive TV viewing profiles from sets of TV shows for which a viewer has provided ratings of the degree of like or dislike.

However, conventional TV recommenders do not permit viewers to correct errors in previously derived profiles. Accordingly, a method is needed which permits viewers to correct possible errors in previously derived TV recommender preference profiles.

SUMMARY OF THE INVENTION

One aspect of the present invention comprises a user interface for a recommender system. The user interface includes a display screen having a first region for displaying a rating derived from a previously defined profile contained in the recommender system; and a second region displaying preference settings in the profile which were used to derive the rating. The user interface enables the preference settings to be changed if the rating derived by the profile is incorrect.

Another aspect of the present invention comprises a method for correcting a previously defined preference profile used in a recommender system to more accurately reflect a user's preferences. The method includes displaying a rating derived from the previously defined profile; displaying preference settings in the profile which were used to derive the rating; and enabling the user to change at least one of the preference settings if the rating derived by the profile is incorrect.

A further aspect of the present invention comprises a recommender system having a preference profile; a user interface including a display screen having a first region for displaying a rating derived from the profile; and a second region displaying preference settings in the profile which were used to derive the rating; wherein the preference settings can be changed if the rating derived by the profile is incorrect.

BRIEF DESCRIPTION OF THE DRAWINGS

The advantages, nature, and various additional features of the invention will appear more fully upon consideration of the illustrative embodiments now to be described in detail in connection with accompanying drawings where like numerals are used to identify like elements and wherein.

DETAILED DESCRIPTION OF THE INVENTION

Figure 1:
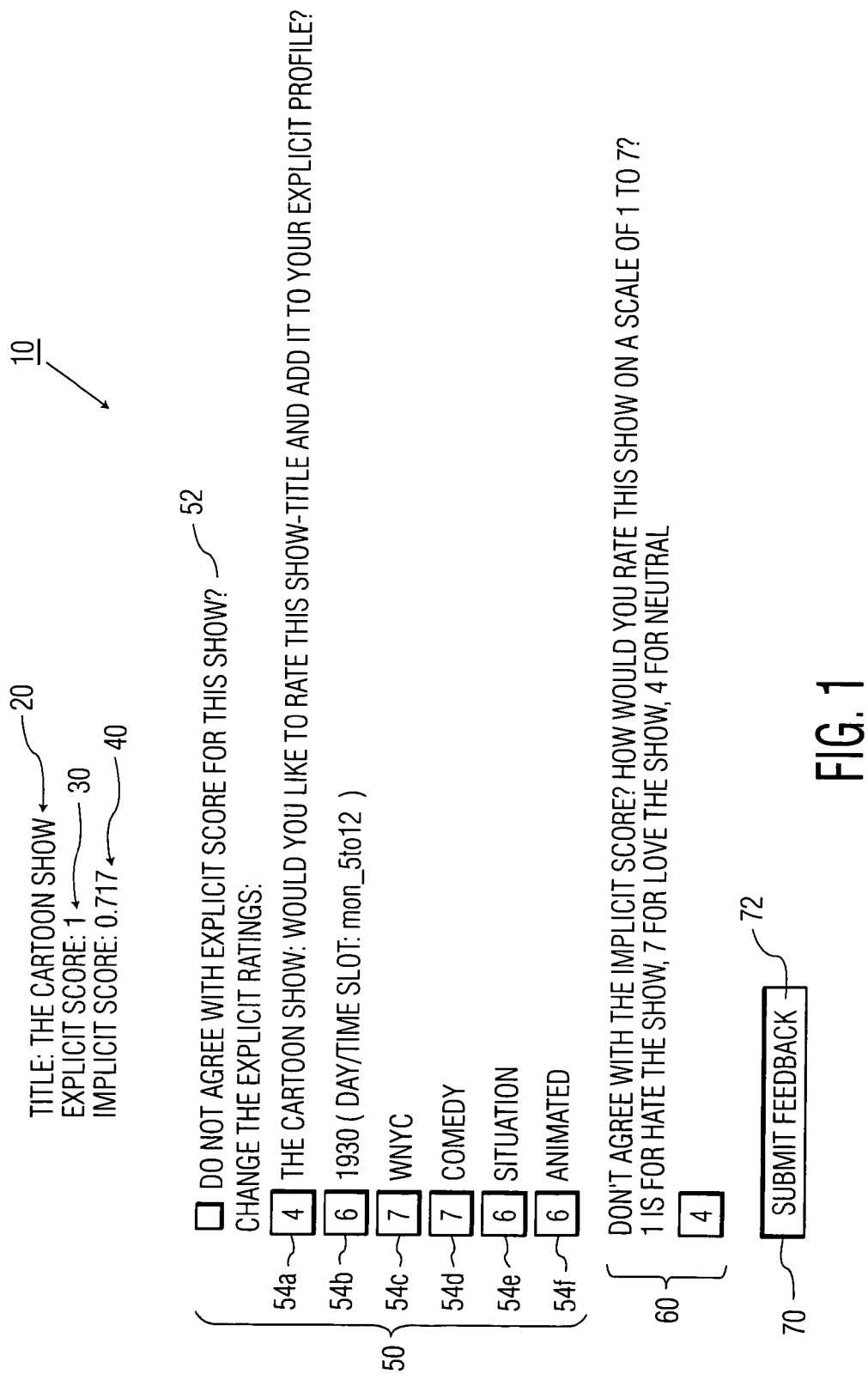
FIG. 1 is a diagram illustrating a user interface (UI) according to an exemplary embodiment of the present invention.
Figure 2:
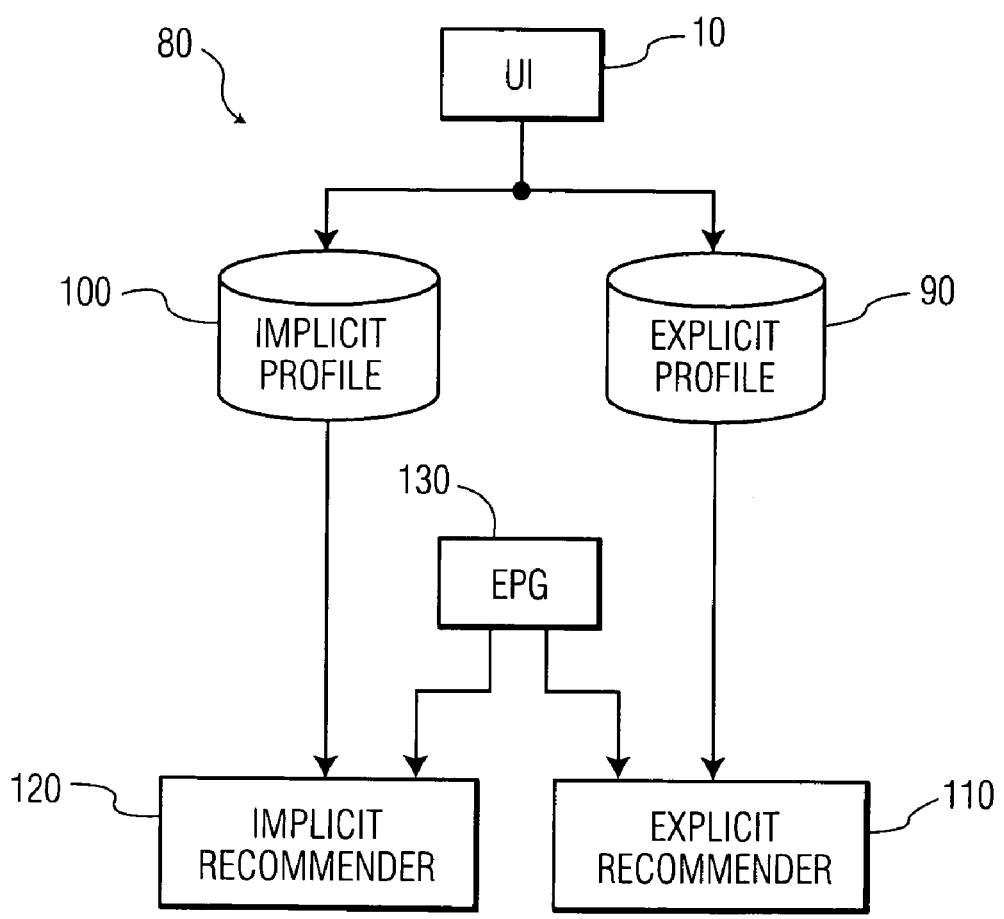
FIG. 2 is a block diagram illustrating an exemplary embodiment of a television recommender which utilizes the UI of the present invention.

FIG. 1 illustrates a user interface 10 (UI) according to an exemplary embodiment of the present invention. As shown in FIG. 2, the UI 10 of the present invention is typically associated with a conventional TV recommender system comprised of explicit and implicit based TV preference profiles 90, 100 which respectively provide input to explicit and implicit recommenders 110, 120. An electronic program guide 130 (EPG) inputs data relating to TV shows to both of the recommenders 110, 120. Such data may include the title, channel, start time and other features of each TV show. The UI 10 may be implemented on a display screen that a user can interact with.

The UI 10 of the present invention provides a method for displaying the characteristics of a TV show being evaluated for feedback, the inferred rating for this show, and the setting preferences of an existing profile that were used to derive this rating. Accordingly, a user of the recommender system can advantageously recognize and correct any flaws in their TV viewing profile(s) that contributed to wrong inferences.

In the shown embodiment of FIG. 1, the UI 10 includes a first region 20 which may display the title of the TV show being evaluated, a second region 30 which may display the explicit rating score of the displayed TV show as derived by the explicit TV viewing preference profile of the associated recommender system and a third region 40 which may display the implicit rating score of the displayed TV show as derived by the implicit TV viewing preference profile of the associated recommender system. A fourth region 50 is provided to enable a user to correct preference settings in the user's explicit TV viewing profile, that were used to derive the subject TV show's explicit rating score. In particular, the fourth region 50 may include a query 52 that asks the user as to whether the user's previously derived preference setting for the displayed TV show is correct. The fourth region may also include a plurality of regions 54a–54f which indicate the user's TV viewing preference settings contained in the user's explicit TV viewing profile. In addition, regions 54a–54f may also permit a viewer to add any features about a TV show, as provided by the EPG, to the viewer's TV viewing profile. For example, in the shown embodiment, region 54a permits the title of the displayed TV show to be added to the viewer's TV viewing profile. These TV viewing preference settings associated with regions 54a–54f may include the user's preference setting for a particular TV show, the day and time slot of the TV show; the user's preference setting for the network which carries the TV show; the user's preference setting for comedy type TV shows; the user's preference setting for situation type TV shows; and the user's preference setting for animated TV shows.

A fifth region 60 may be provided, in addition to or instead of the fourth region, to enable the user to correct preference settings in the user's implicit TV viewing profile, that were used to derive the subject TV show's implicit rating score. A sixth region 70 is provided for a button 72 which submits the feedback to the explicit and implicit based TV recommender profiles.

Although the present invention has been described as it applies to tuning TV viewing profiles used with TV recommenders, the principles of the present invention are not limited to this domain. For example, the principles of the present invention may also be applied to feedback based profile tuning devices for movie, book, audio recording and like recommenders.

While the foregoing invention has been described with reference to the above embodiments, various modifications and changes can be made without departing from the spirit of the invention. Accordingly, all such modifications and changes are considered to be within the scope of the appended claims.

What is claimed is:

1. A user interface for a recommender system, the user interface comprising:
   a display screen having:
      a first region for displaying a rating derived from a previously defined preference profile contained in the recommender system; and
      a second region displaying preference settings in the profile which were used to derive the rating;
      wherein the preference settings can be changed if the rating derived by the profile is incorrect.

2. The user interface according to claim 1, wherein the profile is an explicit-based preference profile.

3. The user interface according to claim 1, wherein the profile is an implicit-based preference profile.

4. The user interface according to claim 1, further comprising a third region for displaying a rating derived from a previously defined second profile contained in the recommender system.

5. The user interface according to claim 4, wherein the profile is an explicit-based preference profile and the second profile is an implicit-based preference profile.

6. The user interface according to claim 4, further comprising a fourth region displaying preference settings in the second profile which were used to derive the rating.

7. The user interface according to claim 6, wherein the preference settings displayed in the fourth region can be changed if the rating derived by the profile is incorrect.

8. The system of claim 4, wherein first and second profile both relate to the same user.

9. The user interface according to claim 1, wherein the second region further enables features to be added to the profile.

10. The user interface according to claim 1, wherein the recommender comprises a television show recommender and the preference profile comprises a television show viewing preference profile.

11. The interface of claim 1, wherein the preferences are changeable by a user viewing the first and second regions and specifying the change with respect to the second region of the display screen.

12. A method for correcting a previously defined preference profile used in a recommender system to more accurately reflect a user's preferences, the method comprising the steps of:
   displaying a rating derived from the previously defined preference profile;
   displaying preference settings in the profile which were used to derive the rating; and
   enabling the user to change at least one of the preference settings if the rating derived by the profile is incorrect.

13. The method according to claim 12, wherein the profile is an explicit-based preference profile.

14. The method according to claim 12, wherein the profile is an implicit-based preference profile.

15. The method according to claim 12, further comprising displaying a rating derived from a previously defined second profile contained in the recommender system.

16. The method according to claim 15, wherein the profile is an explicit-based preference profile and the second profile is an implicit-based preference profile.

17. The method according to claim 15, further comprising displaying preference settings in the second profile which were used to derive the rating.

18. The method according to claim 17, further comprising the step of enabling the user to change at least one of the preference settings in the second profile if the rating derived by the second profile is incorrect.

19. The system of claim 15, wherein first and second profile both relate to the same user.

20. The method according to claim 12, further comprising the step of enabling the user to add features to the profile.

21. The method according to claim 12, wherein the recommender comprises a television show recommender and the preference profile comprises a television show viewing preference profile.

22. A recommender system comprising:
   a preference profile;
   a user interface including a display screen having:
      a first region for displaying a rating derived from the profile; and
      a second region displaying preference settings in the profile which were used to derive the rating;
      wherein the preference settings can be changed if the rating derived by the profile is incorrect.

23. The recommender system according to claim 22, wherein the profile is an explicit-based preference profile.

24. The recommender system according to claim 22, wherein the profile is an implicit-based preference profile.

25. The recommender system according to claim 22, further comprising a second preference profile and a third region for displaying a rating derived from the second preference profile.

26. The recommender system according to claim 25, wherein the profile is an explicit-based preference profile and the second profile is an implicit-based preference profile.

27. The recommender system according to claim 25, further comprising a fourth region displaying preference settings in one of the profiles which were used to derive the corresponding rating.

28. The recommender system according to claim 27, wherein the preference settings displayed in the fourth region can be changed if the rating derived by the profile is incorrect.

29. The system of claim 25, wherein first and second profile both relate to the same user.

30. The recommender system according to claim 22, wherein the second region further enables features to be added to the profile.

31. The recommender system according to claim 22, wherein the recommender comprises a television show recommender and the preference profile comprises a television show viewing preference profile.

32. The interface of claim 22, wherein the preferences are changeable by a user viewing the first and second regions and specifying the change with respect to the second region of the display screen.

\* \* \* \* \*